US012562608B2

(12) United States Patent
Kandasamy et al.

(10) Patent No.: US 12,562,608 B2
(45) Date of Patent: Feb. 24, 2026

(54) MOTOR ASSEMBLY FOR AN APPLIANCE INCLUDING A FINGER GRIP

(71) Applicant: Haier US Appliance Solutions, Inc., Wilmington, DE (US)

(72) Inventors: Senthil Kandasamy, Louisville, KY (US); Edward Simeon Chupka, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 98 days.

(21) Appl. No.: 18/733,453

(22) Filed: Jun. 4, 2024

(65) Prior Publication Data

US 2025/0373096 A1    Dec. 4, 2025

(51) Int. Cl.
H02K 1/27     (2022.01)
D06F 37/30    (2020.01)
H02K 1/2786   (2022.01)
H02K 21/22    (2006.01)

(52) U.S. Cl.
CPC ......... H02K 1/2786 (2013.01); D06F 37/304 (2013.01); H02K 21/22 (2013.01)

(58) Field of Classification Search
CPC .................................................. H02K 1/2786
See application file for complete search history.

(56)                References Cited

FOREIGN PATENT DOCUMENTS

| | | | |
|---|---|---|---|
| CN | 213305136 | U | 5/2021 |
| DE | 10058407 | A1 | 5/2002 |
| KR | 101079091 | B1 | 11/2011 |
| KR | 101227483 | B1 | 1/2013 |

*Primary Examiner* — Jason Y Ko
(74) *Attorney, Agent, or Firm* — Dority & Manning, P.A.

(57)                ABSTRACT

A motor assembly includes a stator having a first diameter; and a rotor having a second diameter greater than the first diameter, the rotor being selectively positioned radially outward from the stator. The rotor includes a body including an annular skirt extending about the circumferential direction, the annular skirt defining an inner circumferential surface facing the stator and an outer circumferential surface opposite the inner circumferential surface along the radial direction; a first flange tab protruding outward from the outer circumferential surface of the annular skirt along the radial direction; and a second flange tab protruding outward from the outer circumferential surface of the annular skirt along the radial direction, the second flange tab being positioned opposite the first flange tab along the radial direction.

18 Claims, 5 Drawing Sheets

MOTOR ASSEMBLY FOR AN APPLIANCE INCLUDING A FINGER GRIP

FIELD OF THE INVENTION

The present subject matter relates generally to domestic appliances, and more particularly to motor assemblies for domestic appliances.

BACKGROUND OF THE INVENTION

Certain domestic appliances, such as laundry appliances, include motors to provide rotation to elements such as a drum, an agitator, or the like. Such motors may include synchronous magnetic motors including a stator and a rotor capable of rotating with respect to the stator. A plurality of magnets within the rotor is selectively activated to rotate the rotor and subsequently rotate the drum, the agitator, or any element requiring rotation.

The motor may thus be a motor assembly requiring assembly, installation, and occasionally maintenance. A user may thus be required to manipulate the parts (e.g., the stator and the rotor) by hand. The delicate nature, positioning, and weight of such parts can thus create pinch points or difficulties in aligning, for example, the rotor with the stator. Accordingly, existing rotors exhibit several drawbacks, including unwieldy designs and tight tolerances.

Accordingly, a motor assembly for an appliance which obviates one or more of the above-mentioned drawbacks would be beneficial. In particular, a rotor for a motor assembly incorporating finger grips would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a motor assembly for an appliance is provided. The motor assembly may include a stator having a first diameter; and a rotor having a second diameter greater than the first diameter, the rotor being selectively positioned radially outward from the stator. The rotor may include a body including an annular skirt extending about the circumferential direction, the annular skirt defining an inner circumferential surface facing the stator and an outer circumferential surface opposite the inner circumferential surface along the radial direction; a first flange tab protruding outward from the outer circumferential surface of the annular skirt along the radial direction; and a second flange tab protruding outward from the outer circumferential surface of the annular skirt along the radial direction, the second flange tab being positioned opposite the first flange tab along the radial direction.

In another exemplary aspect of the present disclosure, a laundry treatment appliance is provided. The laundry treatment appliance may include a wash tub configured to store a fluid; a wash basket received in the wash tub to retain laundry articles therein for washing; and a motor assembly operably connected with the wash basket, the motor assembly defining an axial direction, a radial direction, and a circumferential direction. The motor assembly may include a stator having a first diameter; and a rotor having a second diameter greater than the first diameter, the rotor being selectively positioned radially outward from the stator. The rotor may include a body including an annular skirt extending about the circumferential direction, the annular skirt defining an inner circumferential surface facing the stator and an outer circumferential surface opposite the inner circumferential surface along the radial direction; a first flange tab protruding outward from the outer circumferential surface of the annular skirt along the radial direction; and a second flange tab protruding outward from the outer circumferential surface of the annular skirt along the radial direction, the second flange tab being positioned opposite the first flange tab along the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
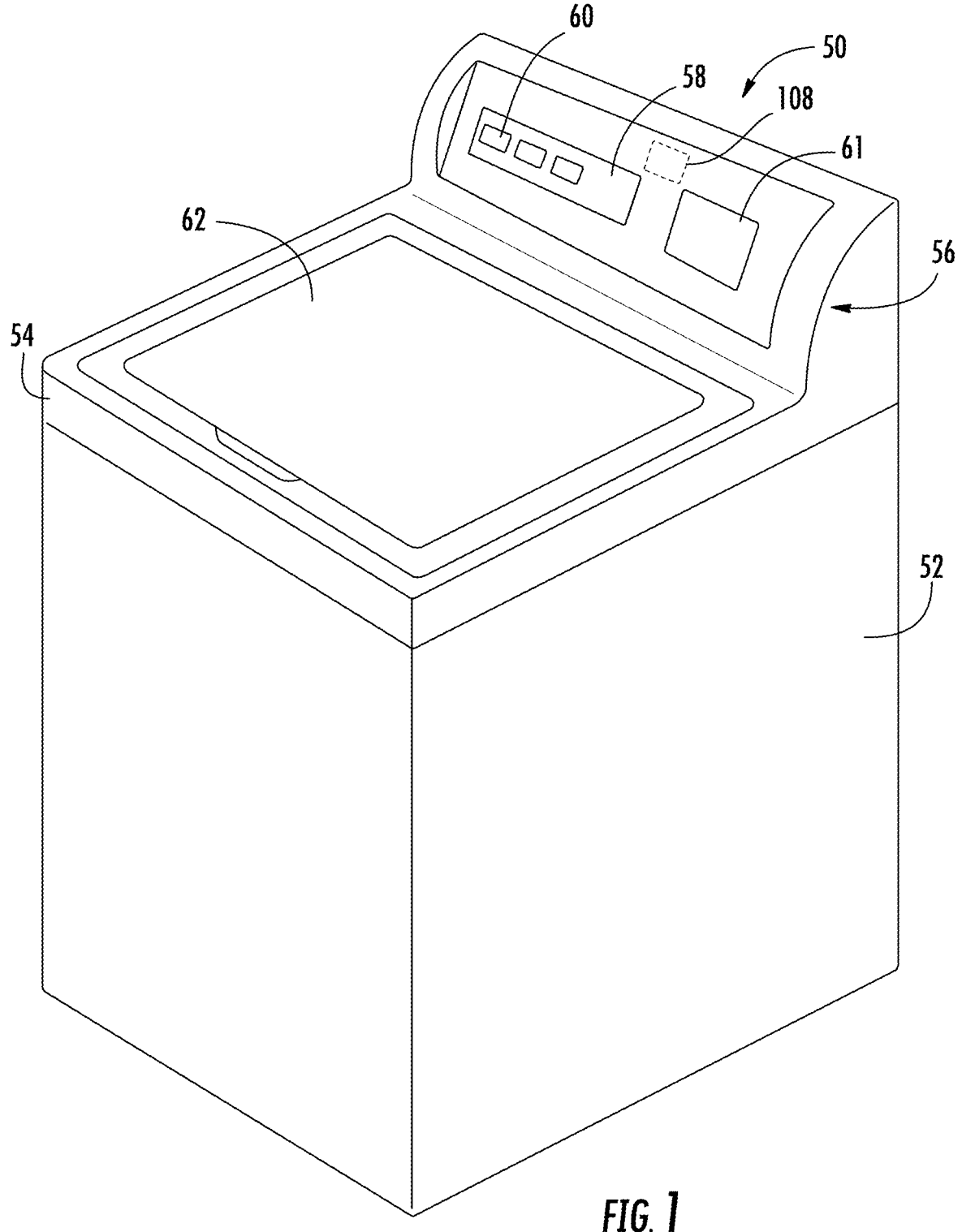
FIG. 1 provides a perspective view of a washing machine appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
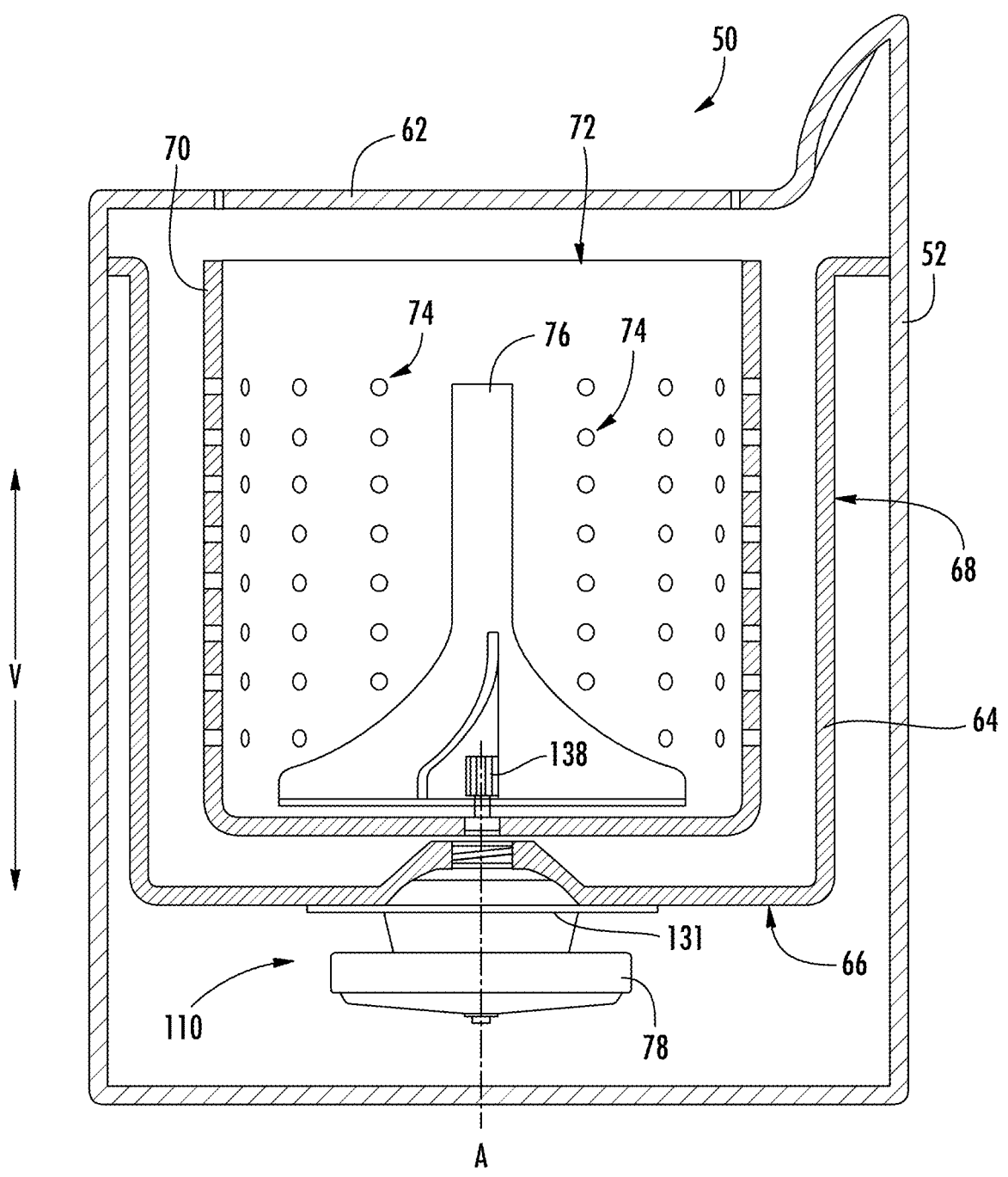
FIG. 2 provides a side, sectional view of the exemplary washing machine appliance of FIG. 1.

Turning now to the figures, FIG. 1 provides a perspective view of a washing machine appliance 50 according to exemplary embodiments of the present disclosure. FIG. 2 provides a side cross-sectional view of the exemplary washing machine appliance 50 of FIG. 1. As shown, washing machine 50 including a cabinet 52 and a top cover 54. FIG. 2 is a side, sectional view of the exemplary embodiment of FIG. 1. A backsplash 56 extends from cover 54, and a control panel 58 including a plurality of input selectors 60 is coupled to backsplash 56. Control panel 58 and input selectors 60 collectively form a user interface input for operator selection of machine cycles and features. For example, in some embodiments, a display 61 indicates selected features, a countdown timer, or other items of interest to machine users.

A door or lid 62 is mounted to cover 54 and is rotatable about a hinge between an open position (not shown) facilitating access to wash tub 64 located within cabinet 52, and a closed position (shown in FIG. 1) forming an enclosure over wash tub 64. Wash tub 64 includes a bottom wall 66 and a sidewall 68. A basket 70 that is rotatably mounted within wash tub 64. A pump assembly (not shown) is located beneath tub 64 and basket 70 for gravity assisted flow when draining tub 64.

Referring now to FIG. 2, wash basket 70 is movably disposed and rotatably mounted in wash tub 64 in a spaced apart relationship from tub sidewall 68 and the tub bottom 66. Basket 70 includes an opening 72 for receiving wash fluid and a wash load therein. Basket 70 includes a plurality of perforations 74 therein to facilitate fluid communication between an interior of basket 70 and wash tub 64.

An agitation element or agitator 76, such as a vane agitator, impeller, auger, or oscillatory basket mechanism, or some combination thereof is disposed in basket 70 to impart an oscillatory motion to articles and liquid in basket 70. In different embodiments, agitator 76 includes a single action element (i.e., oscillatory only), double action (oscillatory movement at one end, single direction rotation at the other end), or triple action (oscillatory movement plus single direction rotation at one end, single direction rotation at the other end). As illustrated in FIG. 2, agitator 76 and wash basket 70 are oriented to rotate about a drive axis A (which is substantially parallel to vertical direction V). Basket 70 and agitator 76 are driven by a drive assembly 110, including a motor assembly (e.g., a permanent magnet synchronous motor assembly) 78 and drive assembly, which operates to turn or rotate agitator 76 or basket 70 with tub 64 as will be described in detail below.

Operation of washing machine appliance 50 is controlled by a controller or processing device 108 (FIG. 1) that is connected (e.g., electrically coupled) to control panel 58 for user manipulation to select washing machine cycles and features. In response to user manipulation of control panel 58, controller 108 operates the various components of washing machine appliance 50 to execute selected machine cycles and features.

Controller 108 may include a memory (e.g., non-transitive media) and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 108 may be constructed without using a microprocessor (e.g., using a combination of discrete analog or digital logic circuitry; such as switches, amplifiers, integrators, comparators, flip-flops, AND gates, and the like) to perform control functionality instead of relying upon software. Control panel 58 and other components of washing machine appliance 50, including drive assembly 110, may be in communication with controller 108 via one or more signal lines or shared communication busses.

In illustrative embodiments, laundry items are loaded into basket 70, and washing operation is initiated through operator manipulation of control input selectors 60. Wash tub 64 is filled with water and mixed with detergent to form a wash fluid. The contents of basket 70 are agitated with agitator 76 for cleansing of laundry items in basket 70. More specifically, agitator 76 is moved back and forth in an oscillatory back and forth motion by drive assembly 110. In some embodiments, agitator 76 is rotated clockwise a specified amount about the drive axis A of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitator 76 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with the pump assembly. Laundry items are then rinsed and portions of the cycle repeated, including the agitation phase, depending on the particulars of the cleaning process selected by a user. In certain embodiments, basket 70 is held in a fixed position during portions of the wash and rinse cycles while agitator 76 is oscillated as described.

One or more spin cycles may also be used as part of the cleaning process. In particular, a spin cycle may be applied after the wash cycle or after the rinse cycle in order to wring wash fluid from the articles being washed. During a spin cycle, basket 70 is rotated at relatively high speeds to help wring fluid from the laundry articles through holes 74.

Figure 3:
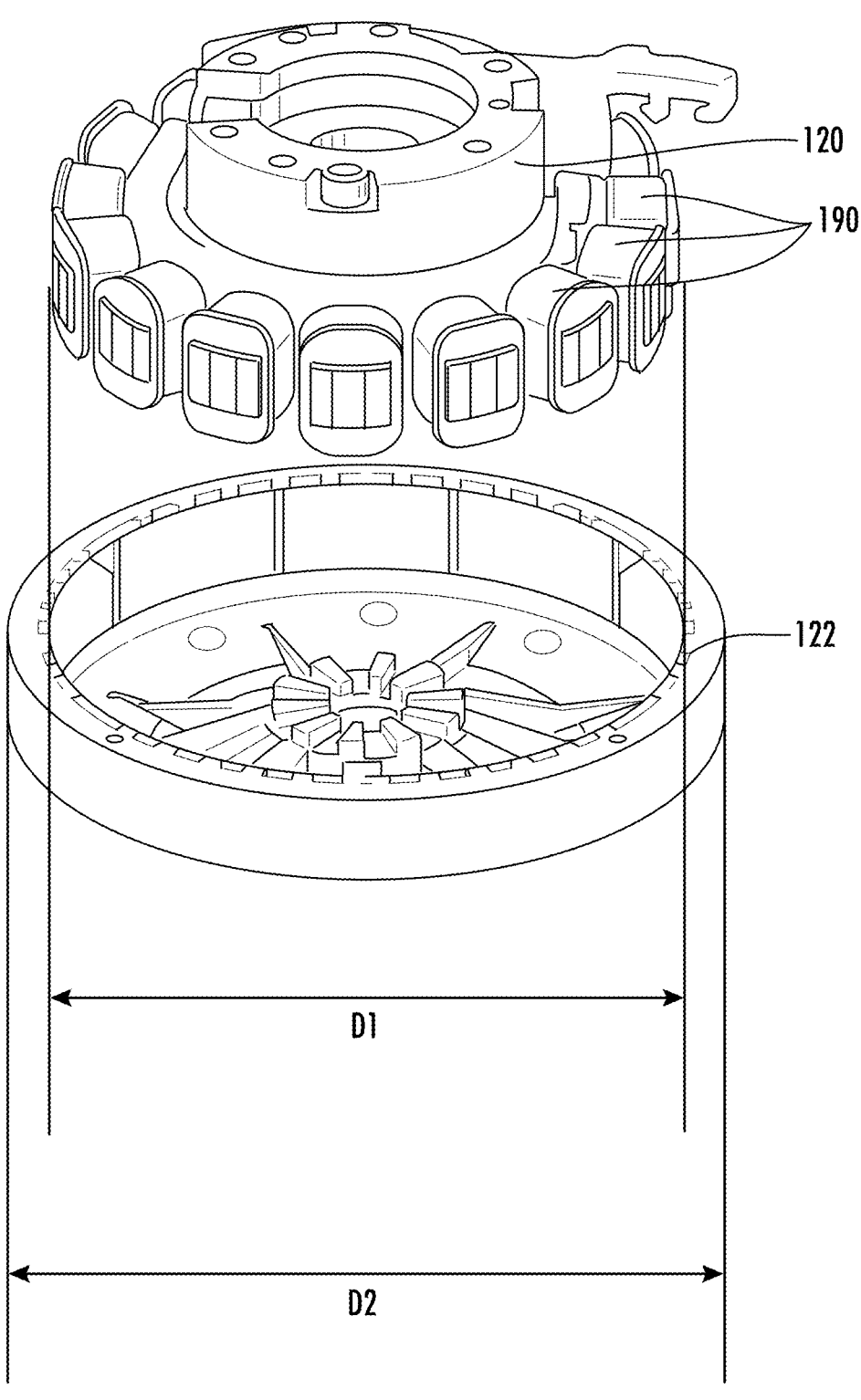
FIG. 3 provides an exploded perspective view of an exemplary drive assembly including a motor assembly according to exemplary embodiments of the present disclosure.

As shown particularly in FIG. 3, motor assembly 78 may include a stator 120 and a rotor 122. When energized with the appropriate power, rotor 122 is caused to rotate while stator 120 remains fixed. In additional or alternative embodiments, multiple magnetic windings 190 are attached to stator 120. Each magnetic winding 190 may be formed from insulated conductive wire. Thus, stator 120 may interact with rotor 122 via magnetic coupling or communication. Stator 120 may have or define a first diameter D1. Accordingly, rotor 122 may have or define a second diameter D2. Second diameter D2 may be greater than first diameter D1. As such, rotor 122 may be positioned radially outward from (e.g., surround) stator 120 (e.g., in an installed position). Rotor 122 may be attached to one end of a drive shaft (e.g., via a coupling). The agitator drive shaft may extend along drive axis A (e.g., vertically) and may be connected with a coupling 138 (FIG. 2). Coupling 138 may attach the agitator drive shaft to agitator 76 (FIG. 2).

Figure 4:
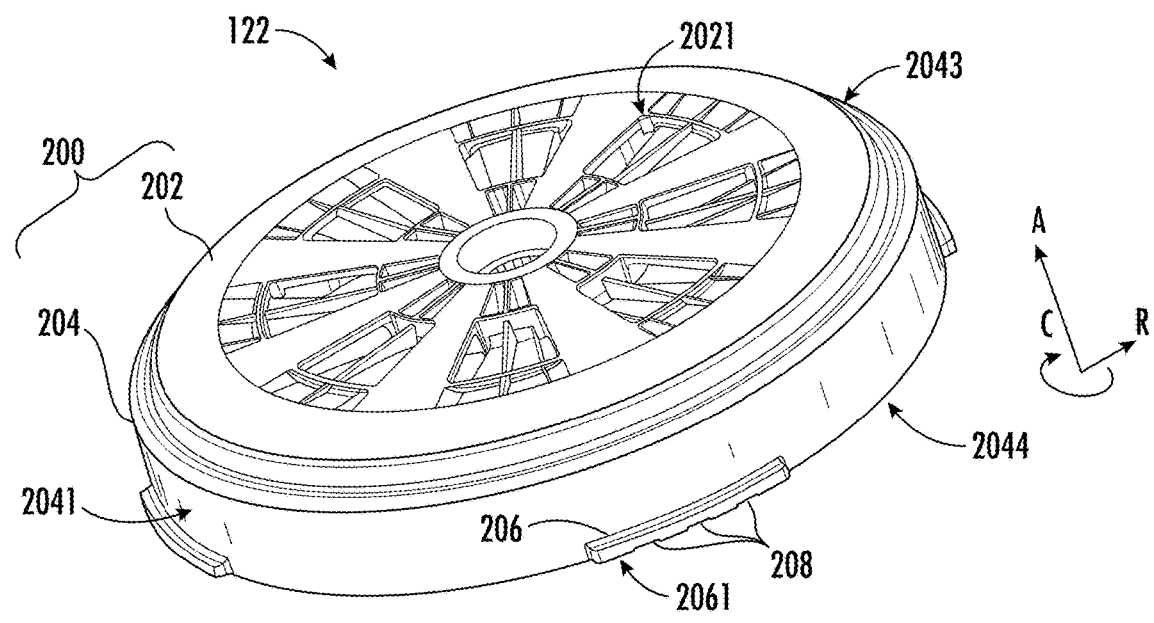
FIG. 4 provides a top perspective view of a rotor of an exemplary motor assembly according to embodiments of the present disclosure.

As described herein, motor assembly 78 defines an axial direction A, a radial direction R, and a circumferential direction C (e.g., as seen in FIG. 4). According to the examples shown, axial direction A is substantially parallel with vertical direction V. However, it should be understood that motor assembly 78 may be oriented in any suitable direction according to specific embodiments and thus axial direction A may not always be parallel with vertical direction V. Rotor 122 may include a body 200. Body 200 may include a main plate 202 and an annular skirt 204 extending from main plate 202 (e.g., along the axial direction A). For instance, annular skirt 204 may extend along or about the circumferential direction C. Main plate 202 may be generally circular. For instance, main plate 202 may define a first planar surface 2021 and a second planar surface 2022 opposite first planar surface 2021.

Annular skirt 204 may extend from second planar surface 2022 (e.g., from a peripheral edge thereof). Annular skirt 204 may thus selectively surround stator 120 (e.g., in an installed position). Annular skirt 204 may define an outer circumferential surface 2041 and an inner circumferential surface 2042 opposite outer circumferential surface 2041. For instance, inner circumferential surface 2042 may face stator 120 in the installed position.

With reference now to FIGS. 4 through 7, rotor 122 may include a plurality of flange tabs 206 extending from annular skirt 204. For instance, rotor 122 may include two flange tabs 206 opposite each other (e.g., along the radial direction R), four flange tabs 206 spaced equidistant from each other (e.g., with center points being spaced every) 90°, or the like.

In some instances, each of the plurality of flange tabs 206 is identical to each other. Accordingly, hereinafter, a single flange tab 206 will be described in detail with the understanding that the description may apply to each of the plurality of flange tabs 206.

Figures 6, 7:
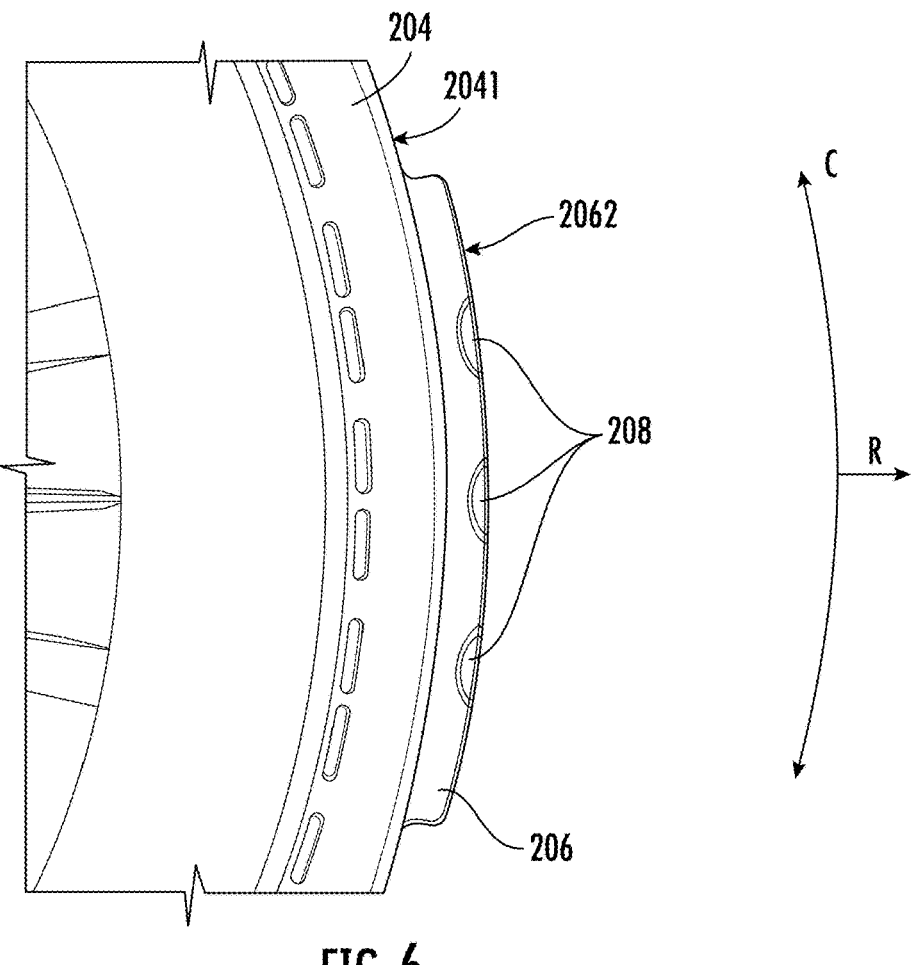
FIG. 6 provides a close-up bottom view of a finger grip of the rotor of FIG. 4 according to exemplary embodiments of the present disclosure.
FIG. 7 provides a side cut away view of the exemplary finger grip of FIG. 6.

Flange tab 206 may extend or protrude from annular skirt 204. In detail, flange tab 206 may protrude along the radial direction R from outer circumferential surface 2041 of annular skirt 204. Flange tab 206 may extend a predetermined length or distance (e.g., along the circumferential direction C) around outer circumferential surface 2041 of annular skirt 204. For instance, flange tab 206 may extend between about 10° and about 20° around annular skirt 204 along the circumferential direction C. Accordingly, flange tab 206 may define an arc length based on the extension degree. Additionally or alternatively, flange tab 206 may define a protruding length (e.g., from outer circumferential surface 2041). The protruding length may be between about 3% and about 10% of the arc length. Thus, as can be seen in FIG. 6, the protruding length may be substantially less than the arc length of flange tab 206.

Figure 5:
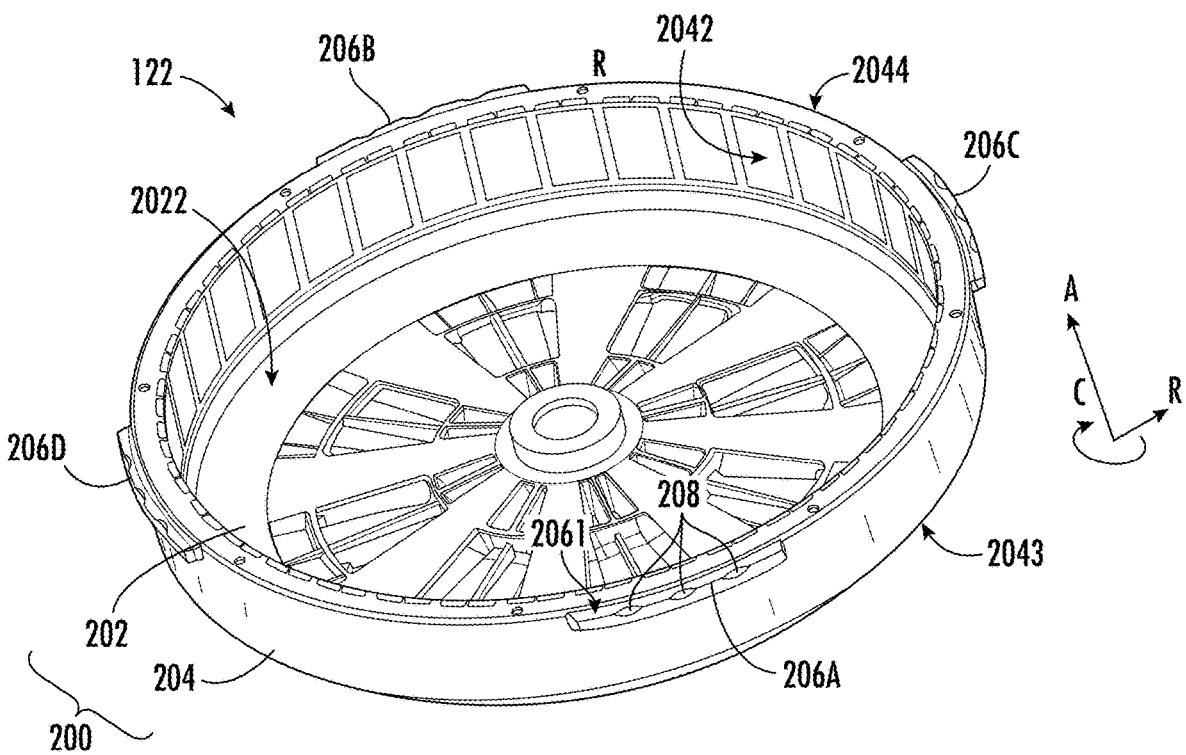
FIG. 5 provides a bottom perspective view of the rotor of FIG. 4.

Flange tab 206 may be positioned distal to main plate 202 along the axial direction A. For instance, as shown in FIGS. 4 and 5 and described above, annular skirt 204 may extend from second planar surface 2022 along the axial direction A. Thus, annular skirt 204 may define a proximal edge 2043 and a distal edge 2044 opposite distal edge 2043. While proximal edge 2043 is connected with main plate 202, flange tab 206 extends at distal edge 2044.

Flange tab 206 may include a plurality of grooves 208. For example, flange tab 208 includes three grooves 208 formed therein. It should be noted that although three grooves 208 are shown and described herein, any amount or number of grooves 208 may be incorporated according to specific embodiments. Each of the plurality of grooves 208 may be identical to each other. Accordingly, a single description of a groove 208 will be provided herein for the sake of brevity with the understanding that the description applies to each groove.

Groove 208 may be recessed into flange tab 206. For instance, groove 208 may be recessed upward (e.g., along the axial direction A) into a bottom surface 2061 of flange tab 206. Referring to FIG. 7, groove 208 may be or include a notch formed into bottom surface 2061 of flange tab 206. As mentioned, two or more grooves 208 may be formed into flange tab 206. Thus, each groove 208 may be spaced equidistant from each other groove 208.

Groove 208 may be recessed inward (e.g., along the radial direction R) into a distal edge surface 2062 of flange tab 206. For instance, grove 208 may form a semi-circular indent into flange tab 206. An opening or outlet at each of distal edge surface 2062 and bottom surface 2061 of flange tab 206. Thus, groove 208 may be referred to as finger or fingertip shaped. Groove 208 may be recessed a predetermined amount into flange tab 206. For instance, groove 208 may be recessed upward between about 5% and about 50% of a total thickness of flange tab 206 along the axial direction A. Moreover, groove 208 may be recessed inward between about 25% and about 60% of a total width of flange tab 206 along the radial direction R. Advantageously, a user may easily grip flange tab 206 via groove or grooves 208 to aid in installation of rotor 122 to stator 120.

As mentioned above, a plurality of flange tabs 206 may be included. For instance, a first flange tab 206A, a second flange tab 206B, a third flange tab 206C, and a fourth flange tab 206D may protrude from annular skirt 204. First flange tab 206A and second flange tab 206B may be opposite each other along the radial direction R (e.g., on opposite sides of rotor 122). Third flange tab 206 may be positioned between first flange tab 206A and second flange tab 206B. For instance, third flange tab 206C may be positioned 90° between each of first flange tab 206A and second flange tab 206B. Similarly, fourth flange tab 206D may be positioned opposite third flange tab 206C.

Similarly, each of the plurality of flange tabs 206 may include one or more of the above-described groove or grooves 208. For instance, first flange tab 206A may include a first set of grooves 208 while second flange tab 206B includes a second set of grooves 208, as would be understood. Additionally or alternatively, each of the plurality of flange tabs 206 may be molded integrally with body 200 of rotor 122. For instance, each of the plurality of flange tabs 206 may be formed as a unitary piece with annular skirt 204 (e.g., via injection molding, casting, or the like).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A motor assembly for an appliance, the motor assembly defining an axial direction, a radial direction, and a circumferential direction, the motor assembly comprising:
a stator having a first diameter; and
a rotor having a second diameter greater than the first diameter, the rotor being selectively positioned radially outward from the stator, the rotor comprising:
a body comprising an annular skirt extending about the circumferential direction, the annular skirt defining an inner circumferential surface facing the stator and an outer circumferential surface opposite the inner circumferential surface along the radial direction;
a first flange tab protruding outward from the outer circumferential surface of the annular skirt along the radial direction; and
a second flange tab protruding outward from the outer circumferential surface of the annular skirt along the radial direction, the second flange tab being positioned opposite the first flange tab along the radial direction.

2. The motor assembly of claim 1, wherein the first flange tab comprises a plurality of first grooves recessed upward along the axial direction into a bottom surface thereof.

3. The motor assembly of claim 2, wherein each of the plurality of first grooves is recessed inward along the radial direction into a distal edge surface of the first flange tab.

4. The motor assembly of claim 1, wherein the second flange tab comprises a plurality of second grooves recessed upward into a bottom surface thereof.

5. The motor assembly of claim 4, wherein each of the plurality of second grooves is recessed inward along the radial direction into a distal edge surface of the second flange tab.

6. The motor assembly of claim 1, wherein the body of the rotor further comprises:
a main plate, wherein the annular skirt extends downward along the axial direction from the main plate.

7. The motor assembly of claim 6, wherein each of the first flange tab and the second flange tab are positioned distal to the main plate along the axial direction.

8. The motor assembly of claim 1, wherein the rotor further comprises:
a third flange tab protruding outward from the outer circumferential surface of the annular skirt along the radial direction, the third flange tab being positioned 90° between the first flange tab and the second flange tab; and
a fourth flange tab protruding outward from the outer circumferential surface of the annular skirt along the radial direction, the fourth flange tab being positioned opposite the third flange tab along the radial direction.

9. The motor assembly of claim 1, wherein each of the first flange tab and the second flange tab are molded integrally with the annular skirt.

10. A laundry treatment appliance comprising:
a wash tub configured to store a fluid;
a wash basket received in the wash tub to retain laundry articles therein for washing; and
a motor assembly operably connected with the wash basket, the motor assembly defining an axial direction, a radial direction, and a circumferential direction, the motor assembly comprising:
a stator having a first diameter; and
a rotor having a second diameter greater than the first diameter, the rotor being selectively positioned radially outward from the stator, the rotor comprising:
a body comprising an annular skirt extending about the circumferential direction, the annular skirt defining an inner circumferential surface facing the stator and an outer circumferential surface opposite the inner circumferential surface along the radial direction;
a first flange tab protruding outward from the outer circumferential surface of the annular skirt along the radial direction; and
a second flange tab protruding outward from the outer circumferential surface of the annular skirt along the radial direction, the second flange tab being positioned opposite the first flange tab along the radial direction.

11. The laundry treatment appliance of claim 10, wherein the first flange tab comprises a plurality of first grooves recessed upward along the axial direction into a bottom surface thereof.

12. The laundry treatment appliance of claim 11, wherein each of the plurality of first grooves is recessed inward along the radial direction into a distal edge surface of the first flange tab.

13. The laundry treatment appliance of claim 10, wherein the second flange tab comprises a plurality of second grooves recessed upward into a bottom surface thereof.

14. The laundry treatment appliance of claim 13, wherein each of the plurality of second grooves is recessed inward along the radial direction into a distal edge surface of the second flange tab.

15. The laundry treatment appliance of claim 10, wherein the body of the rotor further comprises:
a main plate, wherein the annular skirt extends downward along the axial direction from the main plate.

16. The laundry treatment appliance of claim 15, wherein each of the first flange tab and the second flange tab are positioned distal to the main plate along the axial direction.

17. The laundry treatment appliance of claim 10, wherein the rotor further comprises:

a third flange tab protruding outward from the outer circumferential surface of the annular skirt along the radial direction, the third flange tab being positioned 90° between the first flange tab and the second flange tab; and a fourth flange tab protruding outward from the outer circumferential surface of the annular skirt along the radial direction, the fourth flange tab being positioned opposite the third flange tab along the radial direction.

18. The laundry treatment appliance of claim 10, wherein each of the first flange tab and the second flange tab are molded integrally with the annular skirt.

\* \* \* \* \*